3,138,609
PROCESS FOR SYNTHESIS OF VARIOUS
TETRAZOLES
Wayne R. Carpenter, Ridgecrest, Calif., assignor to the
United States of America as represented by the Secretary of the Navy
No Drawing. Filed Oct. 15, 1962, Ser. No. 230,772
12 Claims. (Cl. 260—308)
(Granted under Title 35, U.S. Code (1952), sec. 266)

The invention described herein may be manufactured and used by or for the Government of the United States of America for governmental purposes without the payment of any royalties thereon or therefor.

This invention relates to a new process for the synthesis of various tetrazoles.

The conversion of nitriles to 5-substituted tetrazoles by reaction with azide ion or hydrazoic acid is well established (W. G. Finnegan, R. A. Henry and R. Lofquist, J. Am. Chem. Soc., 80, 3908 (1958), and references contained therein). However, considerable difficulty has been experienced in the condensation formation of tetrazoles by the analogous reaction between nitriles and organic azides. Only two examples of successful condensation have been found in the literature, Von Kereszty et al. in German Patent 611,692 describe the acid-catalyzed cyclization of γ-azidobutyronitrile and δ-azidocapronitrile to form bicyclic tetrazoles.

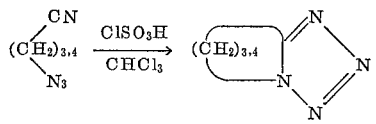

P. A. S. Smith et al. in the J. Org. Chem. 23, 524 (1958), describe the thermal cyclization of 2-azido-2'-cyanobiphenyl to form tetrazolophenanthridine.

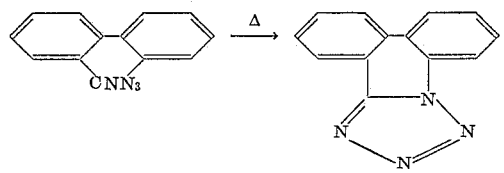

Both of these examples involved an intramolecular condensation reaction. The present invention is a method for the synthesis of tetrazoles by an intermolecular condensation reaction of alkyl and aryl azides with organic electronegative nitriles.

The general purpose of this invention is to provide a new type of intermolecular chemical reaction whereby tetrazoles are prepared by thermal cycloaddition of organic azides to electronegatively substituted nitriles.

An object of the present invention is the provision of a new process for synthesizing monomeric 1,5-disubstituted tetrazoles which are compatible with igniter compositions, high energy propellants and explosives of various types.

Another object is to provide a new type intermolecular chemical reaction which leads to generally higher yields of monomeric 1,5-disubstituted tetrazoles than any other known process.

A further object is the provision of a simple, one-step method for synthesizing a single tetrazole isomer thereby eliminating the necessity of isomer separation.

Other objects and many of the attendant advantages of this invention will be readily appreciated as the same become better understood by reference to the following examples which illustrate the invention but are not to be considered as limiting it.

EXAMPLE I

1-Octyl-5-Trifluoromethyltetrazole 8.66 grams of octyl azide and 3.76 grams of trifluoroacetonitrile were sealed in a glass tube at −70° C. The tube was heated in a reaction bomb at 150° C. for 17.5 hours and then cooled before being opened. Distillation of the liquid product yielded 2.17 grams of octyl azide in the forerun and 6.20 grams of 1-octyl-5-trifluoromethyltetrazole (96% conversion), boiling point 81.5–85°/0.25 mm. An elemental analysis gave the following results for $C_{10}H_{17}N_4F_3$.

Calculated: C=47.99; H=6.85; N=22.39; F=22.77.
Found: C=47.91; H=6.57; N=23.31; F=23.08.

EXAMPLE II

1-Phenyl-5-Perfluoropropyltetrazole 10.17 grams of phenyl azide and 19.64 grams of perfluorobutyronitrile were sealed in a glass tube at 0° C. and heated in a reaction bomb at 130° C. for 17 hours. The tube was cooled to −70° C. before being opened behind a barricade to release internal pressure. The dark, oily product was dissolved in 150 ml. of ether. This solution was hydrogenated with hydrogen (platinum catalyst) to convert azides, azo compound, etc., to amines. These amines were then removed by extraction with dilute sulfuric acid. The ether layer was dried over anhydrous magnesium sulfate, then filtered and concentrated to yield 4.97 grams (22% yield) of brown solid, 1-phenyl-5-perfluoropropyltetrazole, melting point 66–69° C. after recrystallization from ethanol-water and sublimation at 75°/0.1 mm. Elemental analysis of the product gave the following results for $C_{10}H_5N_4F_7$.

Calculated: C=38.23; H=1.60; N=17.83; F=42.33.
Found: C=38.34; H=1.46; N=17.84; F=41.98.

EXAMPLE III

1-Octyl-5-Trichloromethyltetrazole 10.98 grams of trichloroacetonitrile and 8.69 grams of n-octyl azide were sealed in a glass tube and heated in a reaction bomb at 150° C. for 20 hours. The tube was cooled to −70° C. before being opened behind a barricade to release internal pressure. The dark, oily product was fractionated to obtain 11.5 grams (69% yield) of 1-octyl-5-trichloromethyltetrazole, boiling point 152–155° C./0.75 mm. Elemental analysis of the product gave the following results for $C_{10}H_{17}N_4Cl_3$.

Calculated: C=40.08; H=5.72; N=18.70; Cl=35.50.
Found: C=40.06; H=5.93; N=18.69; Cl=35.66.

EXAMPLE IV

Dichlorobis(1-Octyl-5-Tetrazolyl)Methane 15.71 grams of dichloromalononitrile and 29.68 grams of octyl azide were sealed in a glass tube and heated in a reaction bomb at 150° C. for 23 hours. The tube was chilled to −70° C. before being opened behind a barricade to release internal pressure. The black, viscous product was dissolved in 200 ml. of benzene. An equal volume of hexane was added to precipitate tarry materials, which were then removed by filtration. The dark filtrate was passed through an alumina column containing 400 grams of alumina. The product was eluted with a 20-volume-percent solution of methylene chloride in hexane. The product, 8.8 grams (19.8% yield), a dark solid, was purified by recrystallization from ethanol-water, followed by recrystallization from toluene-hexane. The white crystals thus obtained melted at 56–57.5° C. Elemental analysis of the product gave the following results for $C_{19}H_{34}N_8Cl_2$.

Calculated: C=51.34; H=7.69; N=25.16; Cl=15.92.
Found: C=51.59; H=7.17; N=25.30; Cl=15.38.

EXAMPLE V

1-Octyl-5-(2-Methyl-5-Tetrazolyl)Tetrazole 5.53 grams 2-methylcyanotetrazole and 7.72 grams of octyl azide were heated in a reaction bomb at 150° C. for 24 hours. The light yellow liquid product was removed from the bomb and heated to 150°/0.4 mm. to remove the starting materials. The residue solidified on cooling and consisted of 10.1 grams of nearly pure 1-octyl-5-(2-methyl-5-tetrazolyl)tetrazole (76% yield). The material was recrystallized once from ethanol-water and once from ether-pentane, from which transparent, white scales or crystals were obtained, with a melting point 34.5–36°. Elemental analysis of the product gave the following results for $C_{11}N_8H_{20}$.

Calculated: C=49.98; H=7.63; N=42.39. Found: C=50.18; H=7.04; N=42.67.

EXAMPLE VI

1-(1,1-Dihydroperfluorobutyl)-5-Perfluoropropyltetrazole

A mixture of 5.33 grams of 1,1-dihydroperfluorobutyl azide and 8.39 grams of perfluorobutyronitrile was sealed in a glass vial and heated in a bomb reactor at 155° C. for 27 hours. The vial was then cooled and opened. Excess nitrile and azide were removed by placing the vial in hot water. 6.36 grams (64% yield) of a pale, yellow residue was solidified by chilling in ice. The product was crystallized from ether-pentane as long, fibrous, white needles with a melting point of 25.5–26.5°. The material has a strong tendency to sublime even at room temperature. Hence, it was further purified by sublimation at room temperature under vacuum. Elemental analysis of the product gave the following results for $C_8H_2N_4F_{14}$.

Calculated: C=22.87; H=0.48; N=13.37; F=63.31. Found: C=22.64; H=0.39; N=13.19; F=63.36.

The 1,1-dihydroperfluorobutyl azide used herein was prepared by adding 15 grams of sodium azide and 35.4 grams of 1,1-dihydroperfluorobutyl tosylate to 150 ml. of diethylene glycol in a 300 ml. flask equipped with stirrer and a simple distillation apparatus. The mixture was stirred and at the same time heated to 180° C., at which temperature the product began to be evolved along with some water and ammonium azide. 8.6 grams (38% yield) of the azide was produced which consisted of the lower layer of the two phase distillate. The azide was redistilled at 72°/700 mm. It was found to be shock-insensitive. An elemental analysis gave the following results for $C_4H_2N_3F_7$.

Calculated: C=21.34; H=0.90; N=18.67; F=59.10. Found: C=21.15; H=1.23; N=18.81; F=58.90.

EXAMPLE VII

3,3-Bis(5-Perfluoropropyl-1-Tetrazolyl)Oxetane 4.92 grams of 3,3-bis(azidomethyl)oxetane and 18.6 grams of perfluorobutyronitrile were sealed in a glass vial at 0° C. and heated in a reaction bomb at 150° C. for 20 hours. After being cooled to −70° C., the vial was opened behind a barricade. The excess perfluorobutyronitrile was allowed to boil off upon warming to ambient temperature  The yellow, waxy crystalline product weighed 15.63 grams (95% yield based on the azide) and melted at 130–133° C.. It was purified by recrystallization from benzene-ethanol, ethanol-water, and benzene. An elemental analysis gave the following results for $C_{13}H_8F_{14}O$.

Calculated: C=27.97; H=1.44; N=20.07; F=47.65. Found: C=28.01; H=1.48; N=20.03; F=49.14.

3,3-bis(azidomethyl)oxetane used above was prepared by mixing 31 grams of 3,3-bis(chloromethyl)oxetane and 50 grams of sodium azide and heating on a steam bath for 30 hours. The product was steam distilled and then separated from the distillate with the help of ether. The organic phase was dried over anhydrous magnesium sulfate, filtered, and then distilled. The product was collected at 88.5–91.5°/1.0 mm. The yield was 7.3 grams or 25%. An elemental analysis for $C_5H_8ON_6$ gave the following results.

Calculated: C=35.71; H=4.79; N=49.98. Found: C=35.98; H=4.69; N=49.82.

This compound can explode violently if heated above 200° C.

The perfluoro- and perchloro-nitriles used in the examples herein were prepared from the corresponding amides by thoroughly mixing the amide with an equal weight of phosphorus pentoxide and heating the mixture to 160°–170° C. for four hours. The volatile nitriles were trapped at −70° C. and then redistilled. The boiling points of the nitriles are as follows: $CCl_3CN$, 78° C.; $CF_3CN$, −64° C.; and $C_3F_7CN$, −1 to 5° C. Dichloromalononitrile, B.P. 97° C., used in Example IV above was prepared by the method of Ott by chlorination of an aqueous solution of malonitrile at 5° C. [E. Ott and B. Lopmann, Ber., 55, 1255 (1922)].

The alkyl azides employed in Examples I–V were conveniently prepared by stirring a mixture of the alkyl halide, excess sodium azide, and diethylene glycol at 95–100° C. for 20–24 hours. The azide was then steam distilled from the mixture and then redistilled under reduced pressure. It appeared to make little difference whether the halide was chloride, bromide, or iodide. Yields were usually in the 70–80% range.

By the present invention it was discovered that intermolecular condensation of alkyl and aryl azides with electronegative nitriles can be made to occur without catalyst if the nitrile is sufficiently activated by electron-withdrawing groups. Table I below describes the results obtained with the various azides and activated nitriles illustrated in the examples herein:

TABLE I

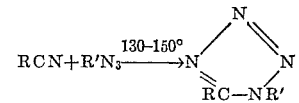

| R | R′ | Yield, percent |
|---|----|----|
| $CF_3-$ | $n\text{-}C_8H_{17}-$ | 96 |
| $C_3F_7-$ | $C_6H_5-$ | 22 |
| $CCl_3-$ | $n\text{-}C_8H_{17}-$ | 69 |
| $NCCCl_2-$ | $n\text{-}C_8H_{17}-$ | 20 |
| $C_3F_7-$ | ![oxetane-CH2N3 group] | 95 |
| ![CH3N=N ring C-] | ---------------- | ---- |
| ---------------- | $n\text{-}C_8H_{17}-$ | 76 |
| $C_3F_7-$ | $C_3F_7CH_2-$ | 64 |

Efforts were made to achieve activation of the nitrile group without the use of electronegative substitution. Of various Lewis acids and protic acids ($AlCl_3$, $BF_3$, $BF_3\cdot(C_2H_5)_2O$, $HSO_3Cl$, $CF_3COOH$, $FeCl_3$, $ZnCl_2$, $PtCl_2$, $CH_3SO_3H$) and various azides (phenyl azide, p-dimethylaminophenyl azide, cyclohexyl azide, octyl azide, butyl azide) and various nitriles (acetonitrile, butyronitrile, benzonitrile, p-nitrobenzonitrile, terphthalonitrile) no combination was found which would furnish a tetrazole. Either the components failed to react at all or else the azide would decompose to nitrogen and a complex mixture of amines, imines, and uncharacterizable materials. Apparently in order to be effective the catalyst must complex with the nitrile, but because of the greater basicity of the azide it is complexed preferentially.

A wide variation was found to exist between the thermal stabilities of organic azides. Whereas n-octyl azide was recovered nearly unchanged after 48 hours at 150° C., p-dimethylaminophenyl azide was completely decomposed after a few hours at 110° C. Phenyl azide is also unstable above 100° C. Hence, in the thermal condensation of phenyl azide with perfluorobutyronitrile only a 32% yield of the corresponding tetrazole was obtained, whereas n-octyl azide affords a 96% yield with trifluoroacetonitrile, the difference being due to the extensive decomposition of phenyl azide.

Obviously many modifications and variations of the present invention are possible in the light of the above teachings. It is therefore to be understood that within the scope of the appended claims the invention may be practiced otherwise than as specifically described.

What is claimed is:

1. A process for preparing tetrazoles by intermolecular condensation comprising heating for periods ranging from about 20 to 24 hours at a temperature from about 130° C. to 150° C. an organic azide selected from the group consisting of phenyl azide, n-octyl azide, octyl azide, 3,3-bis(azidomethyl)oxetane and 1,1-dihydroperfluorobutyl azide and an organic electronegative nitrile selected from the group consisting of perfluorobutyronitrile, dichloromalononitrile, trifluoroacetonitrile and trichloroacetonitrile.

2. The process of claim 1 in which the azide is phenyl azide and the nitrile is perfluorobutyronitrile.

3. The process of claim 1 in which the azide is n-octyl azide and the nitrile is trichloroacetonitrile.

4. The process of claim 1 in which the azide is octyl azide and the nitrile is dichloromalononitrile.

5. The process of claim 1 in which the azide is 1,1-dihydroperfluorobutyl azide and the nitrile is perfluorobutyronitrile.

6. A process for preparing a compound of the formula

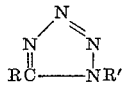

comprising heating in a sealed container to a temperature ranging from 130° to 150° C. for about 20 hours a nitrile having the formula RCN and the azide having the formula R'N$_3$ wherein R is a member selected from the group consisting of CF$_3$, C$_3$F$_7$, CCl$_3$, NCCl$_2$, and

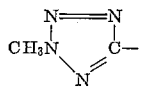

and R' is a member selected from the group consisting of n-C$_8$H$_{17}$, C$_6$H$_5$, C$_3$F$_7$CH$_2$ and

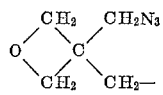

in which n- indicates a normal straight chain isomer.

7. The process of preparing 1,5-disubstituted tetrazoles comprising the steps of
   (a) sealing an organic azide selected from the group consisting of octyl azide, n-octyl azide, 3,3-bis(azidomethyl)oxetane, 1,1-dihydroperfluorobutyl azide, and phenyl azide and an organic electronegative nitrile selected from the group consisting of perfluorobutyronitrile, trifluoroacetonitrile, trichloroacetonitrile and dichloromalononitrile in a container at 0° C.;
   (b) heating said container in a reaction bomb at about 150° C. for about 20 hours until a liquid forms;
   (c) cooling said container to −70° C. before opening; and
   (d) distilling the liquid.

8. The process of claim 7 in which the azide is 1,1-dihydroperfluorobutyl azide and the nitrile is perfluorobutyronitrile.

9. The process of claim 7 in which the azide is phenyl azide and the nitrile is perfluorobutyronitrile.

10. The process of claim 7 in which the azide is octyl azide and the nitrile is trifluoroacetonitrile.

11. The process of claim 7 in which the azide is n-octyl azide and the nitrile is trichloroacetonitrile.

12. The process of claim 7 in which the azide is 3,3-bis(azidomethyl)oxetane azide and the nitrile is perfluorobutyronitrile.

References Cited in the file of this patent

UNITED STATES PATENTS

| | | |
|---|---|---|
| 2,020,937 | Foldi | Nov. 12, 1935 |
| 2,977,372 | Finnegan et al. | Mar. 28, 1961 |